(No Model.)

J. P. CARMICHAEL.
RUBBER DAM CLAMP.

No. 277,224. Patented May 8, 1883.

Witnesses:
E. J. Asmus
Geo. L. Jones

Inventor:
John P. Carmichael
By
Stout & Underwood,
Attorneys.

UNITED STATES PATENT OFFICE.

JOHN P. CARMICHAEL, OF MILWAUKEE, WISCONSIN.

RUBBER-DAM CLAMP.

SPECIFICATION forming part of Letters Patent No. 277,224, dated May 8, 1883.

Application filed February 27, 1883. (No model.)

*To all whom it may concern:*

Be it known that I, JOHN P. CARMICHAEL, of Milwaukee, in the county of Milwaukee, and in the State of Wisconsin, have invented certain new and useful Improvements in Rubber-Dam Clamps for Dental Purposes; and I do hereby declare that the following is a full, clear, and exact description thereof.

My invention relates to devices for securing rubber-dams in place about teeth while they are being filled; and it consists in an improved clamp, which will be fully described hereinafter.

Figure 1:
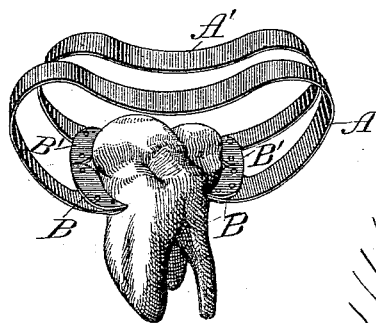
Figure 3:
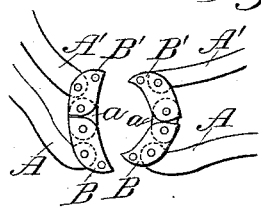
Figure 2:
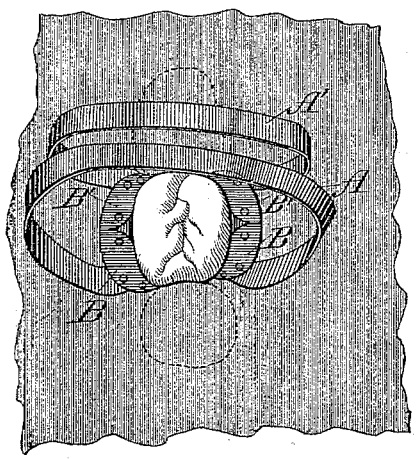
Figure 4:
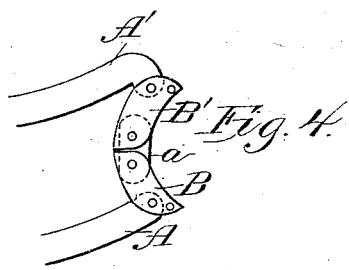
Figure 5:

In the drawings, Figure 1 is a perspective view of a tooth with my clamp attached. Fig. 2 is a top view of a tooth with a rubber dam held in place by the clamp; and Figs. 3, 4, and 5 are details.

A A' are elastic arms, which are to receive the studs on the forceps-points. B B are half-crescent-shaped jaws, that are pivoted at one end, one above and one below each end of the arms A, while B' B' are like jaws, that are pivoted in like manner to the arm A'; and then the jaws at adjacent ends of the arms are connected by a toggle-plate, *a*, which is pivoted in place, so that each pair of jaws may work independently of the others; and, as my device has four pairs of jaws, they will conform themselves to any tooth, no matter how irregular or unusual its form may be. For instance, if a tooth is round, its sides, by forcing the toggle-plate of the jaws to press in about the front and rear of it, or if one side be round and one flat, the toggle-plate will permit both sides of it to be clamped by the jaws, so that there will be no pivotal point on either side which will permit the clamp to rock and release the rubber; and, besides, as these points project in and behind the tooth, they carry the dam down about the tooth in such a way as to wholly protect the tooth from moisture.

In treating teeth that are larger at the neck than at the crown, or such as are partially erupted, dentists have heretofore had great trouble in getting their clamps to hold; but with my device I have no such trouble, as the toggle-plate always throws the points of the jaws around the front and rear of the tooth.

I have shown my device with two separate arms; but I may connect these arms in their middle with equally good results, and, instead of making the arms flat, I may make them of any other shape in cross-section, and, if desired, I may introduce an extra elastic arm, either connected to the others at the center or separate therefrom and intermediate between them, and pivot the ends of said arm to the toggle-plate already described.

What I claim as new, and desire to secure by Letters Patent, is—

A rubber-dam clamp for dentists' use, having pivoted jaws connected by toggle-plates, as set forth.

In testimony that I claim the foregoing I have hereunto set my hand, on this 29th day of January, 1883, in the presence of two witnesses.

JOHN P. CARMICHAEL.

Witnesses:
 S. S. STOUT,
 H. G. UNDERWOOD.